(12) United States Patent
Arana Hidalgo et al.

(10) Patent No.: US 10,906,628 B2
(45) Date of Patent: Feb. 2, 2021

(54) BOX STRUCTURAL ARRANGEMENT FOR AN AIRCRAFT AND MANUFACTURING METHOD THEREOF

(71) Applicant: AIRBUS OPERATIONS S.L., Madrid (ES)

(72) Inventors: Alberto Arana Hidalgo, Madrid (ES); Luis Rodriguez Urbina, Leganes (ES)

(73) Assignee: Airbus Operations S.L., Madrid (ES)

(*) Notice: Subject to any disclaimer, the term of this patent is extended or adjusted under 35 U.S.C. 154(b) by 287 days.

(21) Appl. No.: 16/032,246

(22) Filed: Jul. 11, 2018

(65) Prior Publication Data
US 2019/0016437 A1    Jan. 17, 2019

(30) Foreign Application Priority Data
Jul. 13, 2017    (EP) .................................... 17382460

(51) Int. Cl.
*B64C 3/18*    (2006.01)
*B64C 3/20*    (2006.01)
(Continued)

(52) U.S. Cl.
CPC .............. *B64C 3/185* (2013.01); *B64C 1/065* (2013.01); *B64C 3/20* (2013.01); *B64C 3/26* (2013.01);
(Continued)

(58) Field of Classification Search
CPC . B64C 1/065; B64C 2001/0072; B64C 3/185; B64C 3/20; B64C 3/26;
(Continued)

(56) References Cited

U.S. PATENT DOCUMENTS 2,443,323 A * 6/1948 Nebesar .................... B64C 9/00
                                                  244/123.8
3,907,442 A * 9/1975 Reid ......................... B64C 3/34
                                                  403/37
(Continued)

FOREIGN PATENT DOCUMENTS

EP    2 735 503    5/2014
GB    1097481      1/1968
WO    2010/116170  10/2010

OTHER PUBLICATIONS

Extended Search Report for EP17382460.8, dated Oct. 27, 2017, 6 pages.

*Primary Examiner* — Medhat Badawi
(74) *Attorney, Agent, or Firm* — Nixon & Vanderhye P.C.

(57) ABSTRACT

A box structural arrangement (1) for an aircraft including first (2) and second composite layers (3), at least one spar web (4) extended between opposite edges of the first and second composite layers (2, 3) along a longitudinal direction, and a conduit piece (5) extended between opposite edges of the first and second composite layers (2, 3). The conduit piece (5) has a hollow section (6) comprising at least one conduit (7) dimensioned to receive pipes or harnesses and surrounded by a resilient material (8). The conduit piece (5) is mounted on the spar web (4) to provide a channeled box structural arrangement (1). The box structural arrangement can be applicable in a torsion box or a wing. The invention further refers to a method for manufacturing the box structural arrangement for an aircraft.

14 Claims, 5 Drawing Sheets

(51) Int. Cl.
  *B64C 1/06* (2006.01)
  *B64C 5/06* (2006.01)
  *B64C 3/26* (2006.01)
  *B64C 5/02* (2006.01)
  *F16L 3/00* (2006.01)
  *H02G 3/04* (2006.01)
  *B64C 1/00* (2006.01)

(52) U.S. Cl.
  CPC .............. *B64C 5/02* (2013.01); *B64C 5/06* (2013.01); *F16L 3/00* (2013.01); *H02G 3/0406* (2013.01); *H02G 3/0437* (2013.01); *B64C 2001/0072* (2013.01)

(58) Field of Classification Search
  CPC ..... B64C 5/02; B64C 5/06; F16L 3/00; H02G 3/0406; H02G 3/0437
  See application file for complete search history.

(56) References Cited

U.S. PATENT DOCUMENTS

| | | | | |
|---|---|---|---|---|
| 4,219,980 A * | 9/1980 | Loyd | B29C 65/562 | 52/309.1 |
| 4,256,790 A * | 3/1981 | Lackman | B29C 66/112 | 428/73 |
| 4,298,417 A * | 11/1981 | Euler | B29D 99/0025 | 156/228 |
| 4,331,495 A * | 5/1982 | Lackman | B29C 70/865 | 156/93 |
| 5,332,178 A * | 7/1994 | Williams | B29C 70/446 | 244/123.3 |
| 5,476,704 A * | 12/1995 | Kohler | B29C 66/721 | 428/119 |
| 5,833,786 A * | 11/1998 | McCarville | B64C 1/06 | 156/92 |
| 6,116,539 A * | 9/2000 | Williams | B64C 3/10 | 244/123.14 |
| 6,190,484 B1 * | 2/2001 | Appa | B29C 70/32 | 156/189 |
| 6,638,466 B1 * | 10/2003 | Abbott | B29C 33/68 | 264/238 |
| 6,786,452 B2 * | 9/2004 | Yamashita | B64C 3/00 | 244/117 R |
| 7,052,572 B2 * | 5/2006 | Miura | B29C 43/10 | 156/286 |
| 7,513,769 B2 * | 4/2009 | Benson | B29C 70/504 | 425/374 |
| 7,901,184 B2 * | 3/2011 | Nies | F03D 7/0224 | 416/132 B |
| 7,905,706 B1 * | 3/2011 | Liang | F01D 5/187 | 416/96 R |
| 8,165,703 B2 * | 4/2012 | Burgos Gallego | G06F 30/00 | 700/98 |
| 9,475,586 B2 * | 10/2016 | Hottin | B29C 70/88 | |
| 10,556,665 B2 * | 2/2020 | Best | B64C 3/34 | |
| 2006/0027703 A1 * | 2/2006 | Bussom | B64C 27/463 | 244/17.13 |
| 2006/0226291 A1 * | 10/2006 | Law | B64C 3/42 | 244/123.7 |
| 2007/0177330 A1 * | 8/2007 | Ackerman | B64D 45/02 | 361/220 |
| 2009/0025865 A1 * | 1/2009 | Weidmann | B29C 70/342 | 156/199 |
| 2009/0218450 A1 * | 9/2009 | McAlinden | B64C 9/02 | 244/90 R |
| 2010/0065687 A1 * | 3/2010 | Douglas | B64C 3/185 | 244/130 |
| 2010/0181427 A1 * | 7/2010 | Makela | B64C 3/187 | 244/123.12 |
| 2011/0268603 A1 * | 11/2011 | Chakrabarti | C22C 21/10 | 420/532 |
| 2012/0037755 A1 * | 2/2012 | Tucker | B64C 3/18 | 244/123.1 |
| 2014/0138485 A1 * | 5/2014 | Sanderson | B64C 3/20 | 244/123.1 |
| 2016/0129985 A1 * | 5/2016 | Mohanty | B64C 3/182 | 244/119 |
| 2018/0155006 A1 * | 6/2018 | Arana Hidalgo | B64C 1/26 | |
| 2019/0016437 A1 * | 1/2019 | Arana Hidalgo | H02G 3/0406 | |

* cited by examiner

BOX STRUCTURAL ARRANGEMENT FOR AN AIRCRAFT AND MANUFACTURING METHOD THEREOF

RELATED APPLICATION

This application claims priority to European patent application EP17382460.8 filed Jul. 13, 2017, the entirety of which is incorporated by reference.

FIELD OF INVENTION

The present invention refers to a box, such as a torsion box, structural arrangement for an aircraft, in particular, to be used in a wing, a horizontal tail plane (HTP) and a vertical tail plane (VTP) of an aircraft.

BACKGROUND

The use of composite materials formed by an organic matrix and unidirectionally orientated fibers, such as Carbon Fiber Reinforced Plastic (CFRP), in the manufacture of structural components of an aircraft, such as wings, HTP, VTP and other components, is well known in the aeronautical industry.

It is also well known that, to provide hydraulic and/or electrical supply in the aircraft, pipeline and harness installations are required throughout the aircraft. Typically, these installations are done by connecting pipelines and harnesses at discrete points of structural components of the aircraft. Usually, pipelines and harnesses follow specific routes within the aircraft to reach the locations where a supply connection is required. For that, the pipelines and harnesses must extend through apertures in the structural components of the aircraft.

Figure 1:
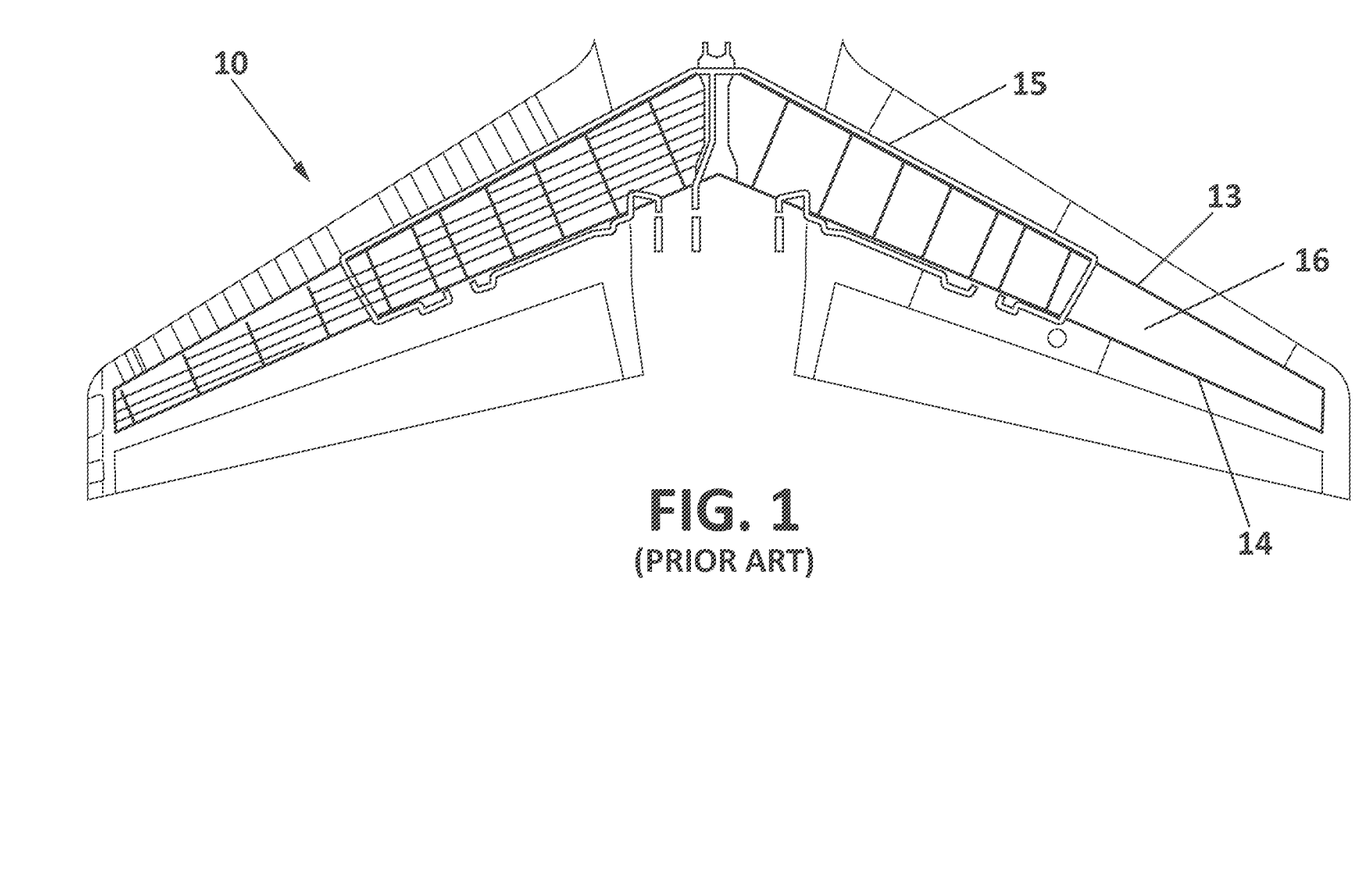
FIG. 1 shows a schematic view of a conventional HTP equipped with a hydraulic pipeline that crosses both HTP lateral boxes.
Figure 2A:
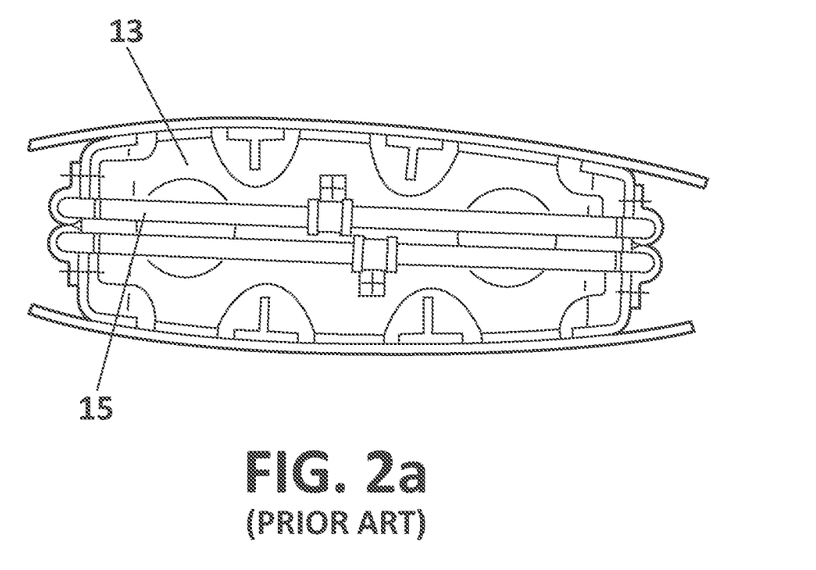
FIGS. 2a and 2b show a schematic front view (drawing A) and perspective view (drawing B) of a box structural arrangement of one the HTP lateral boxes of FIG. 1.
Figure 2B:
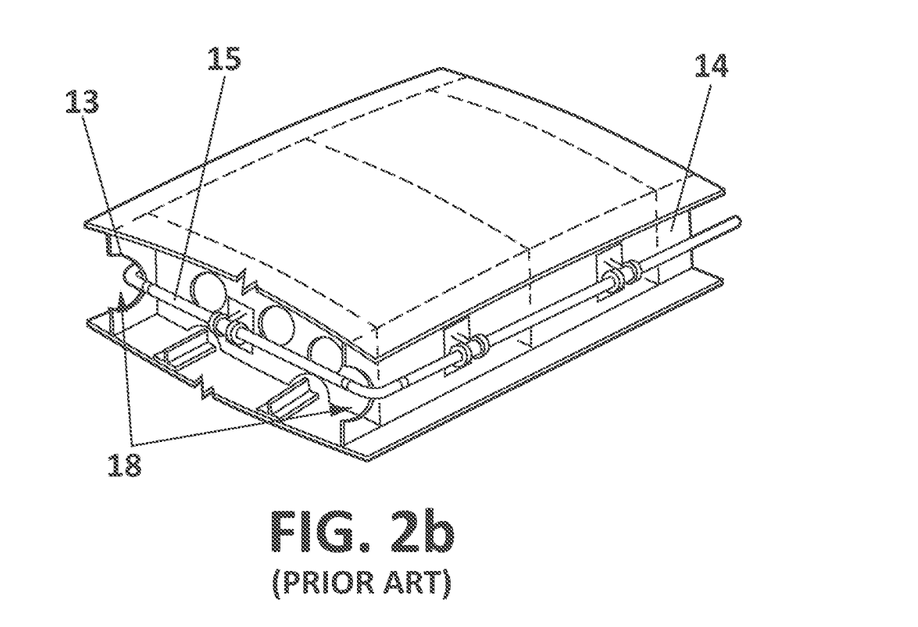

FIGS. 1, 2a and 2b show a conventional HTP (10) equipped with a hydraulic pipeline (15). As shown, the hydraulic pipeline (15) follows a longitudinal (spanwise) direction and crosses the HTP lateral boxes (16), requiring apertures (18) in the front (13) and rear HTP spars (14). FIG. 2a shows a front view and FIG. 2b shows a perspective view of the HTP lateral box (16). The hydraulic pipeline (15) is shown extending through apertures in the front (13) and rear HTP spars (14).

The conventional routing of the hydraulic pipeline (15) is typically complicated, is difficult to inspect and remove and inhibits access to other aircraft components near the pipeline.

Further, the conventional routing tends to affect aerodynamic performance and load bearing behavior of an aircraft because the HTP lateral box must include access panels (service doors) to allow maintenance personnel to reach the pipelines and harnesses. Thus, there is a long felt need to simplify the installation, inspection and removal of pipelines and harnesses in structural components of the aircraft.

SUMMARY

The present invention may be embodied to provide an arrangement for pipelines and harnesses for a torsion box of an aircraft that is easy to install, inspect and remove than conventional pipelines and harnesses. The invention may be incorporated in a lateral/torsion box of a horizontal tail plane, a wing, or a vertical tail plane.

In one embodiment, the invention may be a piping and harness arrangement for a HTP lateral box structure that eases installation and maintenance tasks in an aircraft, and allows connections and bifurcations of electric and hydraulic connections to be performed from outside the lateral box structure. The invention may also be embodied as a HTP or VTP lateral box for an aircraft that is capable of reducing the fatigue suffered by traditional boxes that are conventionally attached at discrete support points.

The invention may be embodied as a torsion box structure for an aircraft that comprises first and second composite layers, at least one spar web extended between opposite edges of the first and second composite layers along a longitudinal direction, and a conduit piece extended between opposite edges of the first and second composite layers. The conduit piece is a hollow section that comprises at least one conduit dimensioned to receive pipes or harnesses and surrounded by a resilient material. The conduit piece is mounted on the spar web to provide a channeled box extending through the lateral box structure.

The conduit piece provides a channel(s) for pipes and/or harnesses required for providing electrical or hydraulic supply in the aircraft. Because there is a conduit piece to channel pipes and/or harnesses, there is less of a need to create, e.g., drill, hoes in structural components, such as ribs and spars, in a torsion box to allow for pipes and harnesses.

Further, the conduit piece may be on an outside surface of a spar of the HTP or VTP lateral box or other torsion box. Thus, the channels in the conduit piece can be accessed from outside of the box to make from the outside of the box connections, bifurcations, installation and removals of hydraulic piping and electrical wiring. Access from outside of the box reduces the need for access ports and cover plates over such ports on the skin structure of the boxes. Also, the maintenance personnel have easy access to hydraulic piping, electrical wiring and harnesses because they are on the outside surfaces of spars forming the boxes. Thus, the personnel are better able to work on the piping, wiring and harnesses which improves the reliability and integrity of the installation, and minimizes the potential hydraulic leakages from the pipelines.

In addition, the torsion box structure with a conduit piece on a spar tends to attenuate vibration and fatigue problems experienced by conventional box arrangements. In a conventional box arrangement there are discrete points of support in the box provide for the passage of hydraulic pipelines, electrical wiring and harnesses. These discrete points and the pipes, wires and harnesses at the points are susceptible to damage due to vibration and fatigue. In contrast, a conduit piece extending along a spar of the box provides a continuous support for pipes, wires and harnesses and spreads their load through a large area of the spar.

The invention may be embodied as a method for manufacturing a box structural arrangement for an aircraft, comprising the steps of providing a first and a second layer of composite material and a spar web extended between opposite edges of the first and second composite layers, arranging the spar web between opposite edges of the first and second composite layers along a longitudinal direction, providing a conduit piece extended between opposite edges of the first and second composite layers, wherein the conduit piece has a hollow section a conduit(s) dimensioned to receive pipes (for hydraulic fluid and/or electrical wiring) or harnesses and surrounded by a resilient material, and mounting the conduit piece on an outer surface of the spar web to form a channeled box structural arrangement. The method provides a simple way of producing reliable boxes, which are specially designed to simplify the installation of pipelines and harnesses throughout the aircraft.

SUMMARY OF FIGURES

For a better comprehension of the invention, the following drawings are provided for illustrative and non-limiting purposes, wherein.

DETAILED DESCRIPTION

Figure 3A:
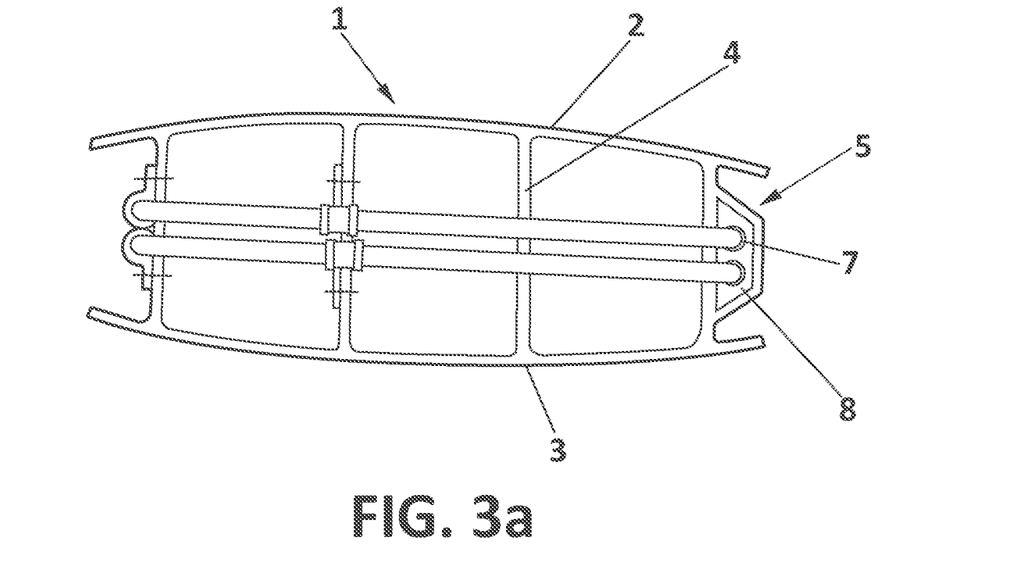
FIGS. 3a and 3b shows a schematic front view (drawing A) and perspective view (drawing B) of a box structural arrangement for an aircraft.
Figure 3B:
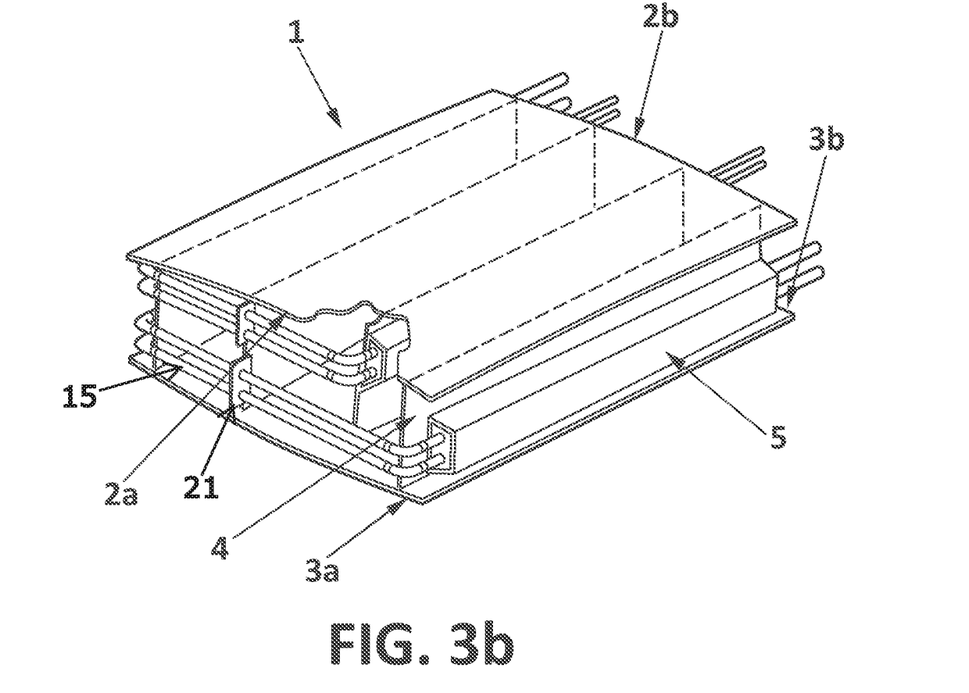

FIGS. 3a and 3b show a box structural arrangement (1) for an aircraft, such as a lateral (torsion) box for a wing, HTP or VTP. the box structural arrangement (1) comprises first (2) and second composite layers (3), at least one spar web (4) transversely arranged between the first (2) and second composite layers (3), and a conduit piece (5) mounted on the at least one spar web (4). The first and second composite layers may be skins forming outer aerodynamic surfaces on the wing, HTP or VTP such as shown as (1).

The spar web (4) is extended between opposite edges (2a, 2b, 3a, 3b) of the first and second composite layers (2, 3) following a longitudinal direction. Thus, the spar web (4) has substantially the same length as the first (2) and second composite layers (3) to provide a continuous support to the conduit piece (5). The spar web may be embodied as a spar.

The conduit piece (5) is also extended between opposite edges (2a, 2b, 3a, 3b) of the first and second composite layers (2, 3). Thus, the conduit piece (5) has similar (or same) length as the spar web (4) to provide continuous encapsulation (and support) for the pipes or harnesses (19) along the box structural arrangement (1)

The pipelines or harnesses 15 may extend the spanwise length of one or more of the spars. For all or most of the length of a spar, the pipelines and harnesses are encased in respective conduits (7), also referred to as channels, of the conduit piece (5).

Figures 5A, 5B:
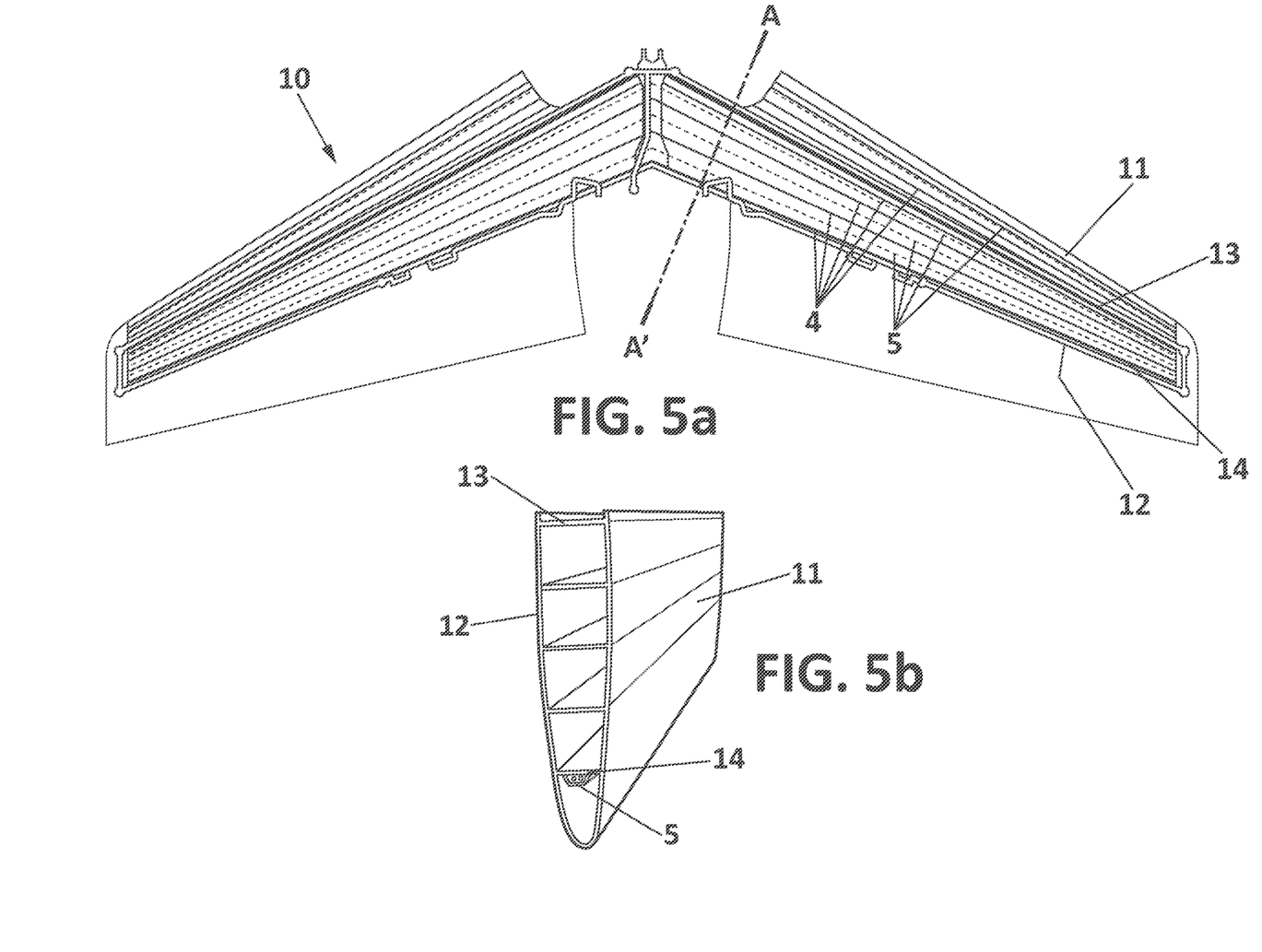
FIGS. 5a and 5b show a schematic perspective view (drawing A) of an HTP equipped with the box structural arrangement, and a cross sectional view (drawing B) of the A-A' axis depicted in drawing A.

The spars (4) with the conduit pieces (5) may be the front and/or rear spars as shown in FIGS. 3a, 5a and 5b. In addition, a spar internal to the torsion box may also have a conduit piece, as is shown in FIG. 3b. As is shown in FIG. 3a, a torsion box (1) may have a front/rear spar (4) with a conduit piece (5) and another rear/front spar that uses mounting brackets to support the pipelines and/or harnesses.

The pipelines and/harness may also extend in a chordwise direction across edges of the spars forming the torsion box (1). As shown in FIG. 3b, the spare edges may include brackets 21 that support the pipelines and/or harnesses at an end/edge of the spar.

Figure 4A:
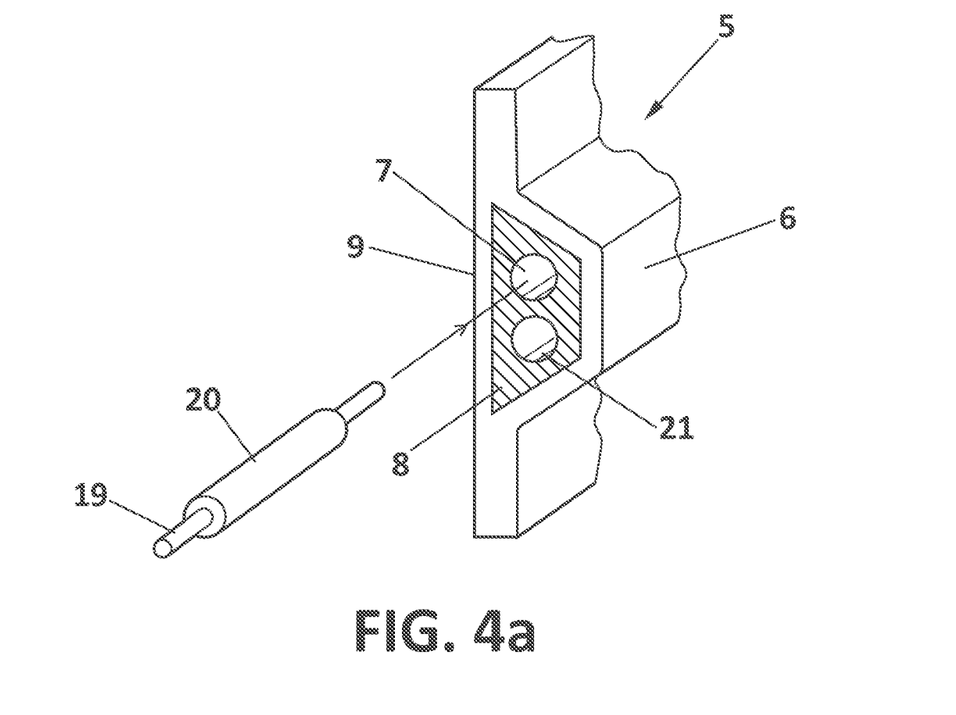
FIGS. 4a and 4b show a perspective view of the conduit piece (drawing A) and the conduit piece mounted on the spar web (drawing B).
Figure 4B:
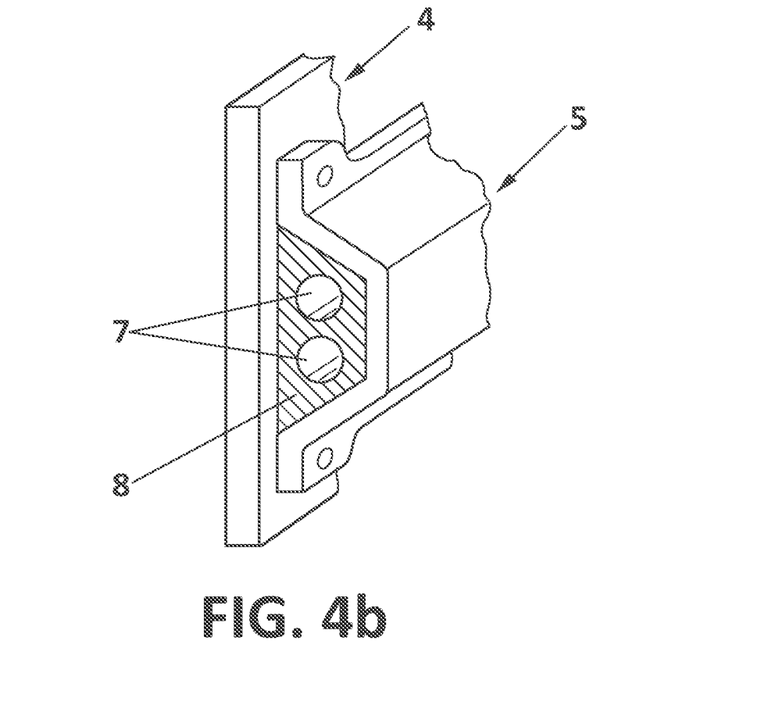

As shown in FIGS. 4a and 4b, the hollow section (6) of the conduit piece (5) encloses two conduits (7) (channels or canals) surrounded by a resilient material (8). The conduits (7) are dimensioned to receive pipes or harnesses (19), which will be preferably coated by a hard cover (20), e.g., sleeve, to provide rigidity and an easy insertion into the conduits (7).

The conduits (7) may include a foam bed surface (21) to ease the introduction of pipes or harnesses (19). The foam bed surface 21 may be a cylindrical surface dimensioned to slidably receive and support the hard cover (20) for the pipes or harnesses (19).

As shown in FIGS. 4a and 4b, the conduit piece (5) may have a cross-sectional shape of an omega or trapezoidal shape. The conduit piece may be integrated into the spar as shown in FIG. 4a or mounted to a surface of a web of the spar as shown in FIG. 4b. If integrated into the spar, one side of the conduit piece has a flat mounting surface (9) to facilitate its integration into the spar web (4). Alternatively and as shown in FIG. 4b, the conduit piece (5) may have an open side that is closed by a surface of the spar (4) to which the conduit piece is attached. As shown in FIG. 4b, the conduit piece (5) may be attached to the web of a spar (4) by fasteners. Alternatively, the conduit piece (5) may be integrated into the spar (4) such as by molding as a single component the spar (4) and the conduit piece (5).

The resilient material (8) may be foam, plastic or other deformable and resilient material. The resilient material (8) substantially entirely fills a cross-sectional area of the hollow channel section (6) of the conduit piece (5). The resilient material (8) includes one or more conduits (7) which are hollow sections of the resilient material (8). The resilient material may extend along the entire length of the conduit piece (5) or be arranged at various sections along the length of the conduit piece (5) such as at the ends of the conduit piece (5) and at a middle region of the conduit piece.

FIGS. 5a and 5b show a perspective and cross-sectional view of a horizontal tail plane (10). The horizontal tail plane (10) has upper (11) and lower skins (12), and forward (13) and rear spars (14) arranged along a spanwise direction. The horizontal tail plane (10) further comprises the box structural arrangement (1) described above, wherein the upper and lower skins (11, 12) comprises the first (2) and second composite layers (3), and wherein at least one conduit piece (5) is mounted on each one of the forward spars (13) and the rear spars (14).

The conduit piece (5) and the spar web (4) may extend between the shortest opposite edges of the first and second composite layers (2, 3) following a spanwise direction.

The invention may be deployed to provide an alternative installation concept that offers a clean and smooth surface for aerodynamic purposes. The potential extra weight of the conduit piece till the end of the stabilizer is compensated with the aerodynamic benefit of such a clean surface.

Similarly, the invention may be embodied within a wing or a vertical tail plane that comprises a box structural arrangement as described.

The invention may be embodied as a method for manufacturing a box structural arrangement (1) for an aircraft as described above. The method comprises the steps of:

(a) providing a first and a second layer of composite material (2, 3), providing at least one spar web (4) extended between opposite edges (2a, 2b, 3a, 3b) of the first and second composite layers (2, 3), (b) arranging the spar web (4) between opposite edges (2a, 2b, 3a, 3b) of the first and second composite layers (2, 3) along a longitudinal direction, (c) providing a conduit piece (5) extended between opposite edges (2a, 2b, 3a, 3b) of the first and second composite layers (2, 3) and having a hollow section (6) (d) comprising at least one conduit (7) dimensioned to receive pipes or harnesses and surrounded by a resilient material (8), (e) mounting the conduit piece (5) on the spar web (4) to form a channeled box structural arrangement (1).

The large and single pieces of pipelines/harnesses may be easily installed from one side in the factory. In case of stabilizers (HTP, VTP) connections/bifurcations can be done from outside their boxes, removing then the need for access panels (service doors) in the middle of these components. The potential extra weight is compensated with the cleanness of the surface that leads to aerodynamic benefits.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A box structural arrangement for an aircraft comprising:
    a first composite layer and a second composite layer;
    a front spar spanning the first and second composite layers and extending between opposite edges of the first and second composite layers along a longitudinal direction of the box structural arrangement, wherein the front spar includes a spar web having an outer surface facing outward of the box structural arrangement; a conduit piece mounted to the outer surface, between the first and second composite layers, and having a hollow section filled with a resilient material, and
    a first conduit and a second conduit in the resilient material and each extending entirely through the conduit piece from a first end of the conduit piece to a second end of the conduit piece, wherein the first and second conduits are each dimensioned to a receive a respective pipe.

2. The box structural arrangement for the aircraft according to claim 1, wherein the resilient material includes a foam bed having conduits each configured to support one of the pipes.

3. The box structural arrangement for the aircraft according to claim 1, wherein the conduit piece has in cross-section an omega shape or a trapezoidal shape, and the conduit piece includes a flat mounting surface.

4. The box structural arrangement for the aircraft according to claim 1, wherein the resilient material includes foam or plastic.

5. The box structural arrangement as in claim 1, further comprising:
    a horizontal tail plane including an upper skin and a lower skin, a forward tail plane spar and a rear tail plane spar arranged along a spanwise direction of the horizontal tail plane,
    wherein the upper and lower skins form the first and second composite layers, and the spar web includes respective spar webs on each of the forward tail plane spar and the rear tail plane spar, and
    wherein the conduit piece includes a conduit piece mounted on the forward tail plane spar and another conduit piece mounted on the rear tail plane spar.

6. The box structural arrangement as in claim 1, further comprising a wing comprising an upper skin and a lower skin, a forward wing spar and a rear wing spar each arranged along a spanwise direction of the wing,
    wherein the upper and lower skins form the first and second composite layers, and the spar web includes respective spar webs on each of the forward wing spar and the rear wing spar, and
    wherein the conduit piece includes a conduit piece mounted the forward wing spar and another conduit piece mounted on the rear wing spar.

7. The box structural arrangement as in claim 1, wherein the arrangement further comprises:
    a vertical tail plane for an aircraft comprising skins on opposites sides of the vertical tail plane, a forward vertical tail plane spar, and a rear vertical tail plane spar both arranged in a spanwise direction of the vertical tail plane;
    wherein the skins form the first and second composite layers, and the spar web includes respective spar webs on each of the forward and rear vertical tail plane spars, and
    wherein the conduit piece includes a conduit piece mounted on the forward vertical tail plane spar and another conduit piece mounted on the rear tail plane spar.

8. A method to manufacture a box structural arrangement for an aircraft, comprising:
    providing a first layer of composite material and a second layer of composite material,
    positioning a front spar to span between the first and second layers of the composite material, wherein the front spar includes a spar web having an outer surface facing outward of the box structural arrangement; and
    mounting a conduit piece on the outer surface of the front spar to extend along more than one-half of a length of the front spar and positioned between the first and second composite layers, wherein the conduit piece includes a hollow section within which is a resilient material having first and second conduits each dimensioned to receive a respective one of the pipes and the first and second conduits extend entirely through the conduit piece from a first end of the conduit piece to a second end of the conduit piece.

9. A structural box assembly for a torsion box of an aircraft, the structural box comprising:
    skins formed of composite layers and having outer surfaces forming an outer surface of the aerodynamic component;
    a front spar spanning between the skins, and extending a length of the torsion box in a spanwise direction of the aerodynamic component, wherein the front spar includes a web having a front surface facing outward of the torsion box;
    a hollow conduit piece on the front surface of the web of the spar, wherein the hollow conduit piece extends more than one-half of the length of the front spar and the conduit piece is configured to receive pipes which extend the length of the conduit piece;

a resilient and deformable material within the hollow conduit piece, wherein the resilient and deformable material abuts inner walls of the hollow conduit piece; and first and second channels within the resilient and deformable material which are parallel to the web of the spar, wherein the first and second channels are each configured to receive a respective one of the pipes.

10. The structural box assembly of claim 9, further comprising a bracket on an edge of a second spar, wherein the second spar spans between the skins and the bracket is configured to receive the pipes.

11. The structural box assembly of claim 9, wherein the skins are an upper skin and a lower skin of a lifting surface.

12. The structural box assembly of claim 9 wherein the skins include a left-side skin and a right-side skin of a vertical tail plane.

13. The structural box assembly of claim 9, further comprising a rear spar spanning between the skins, and another conduit piece is on an outer surface of a web of the rear spar.

14. The structural box assembly of claim 9 wherein the front spar is configured to attach to a leading edge structure of the aerodynamic component.

\* \* \* \* \*